July 30, 1957  L. L. CHARLSON  2,800,922
HYDRAULIC VALVE
Filed Feb. 15, 1955  2 Sheets-Sheet 1
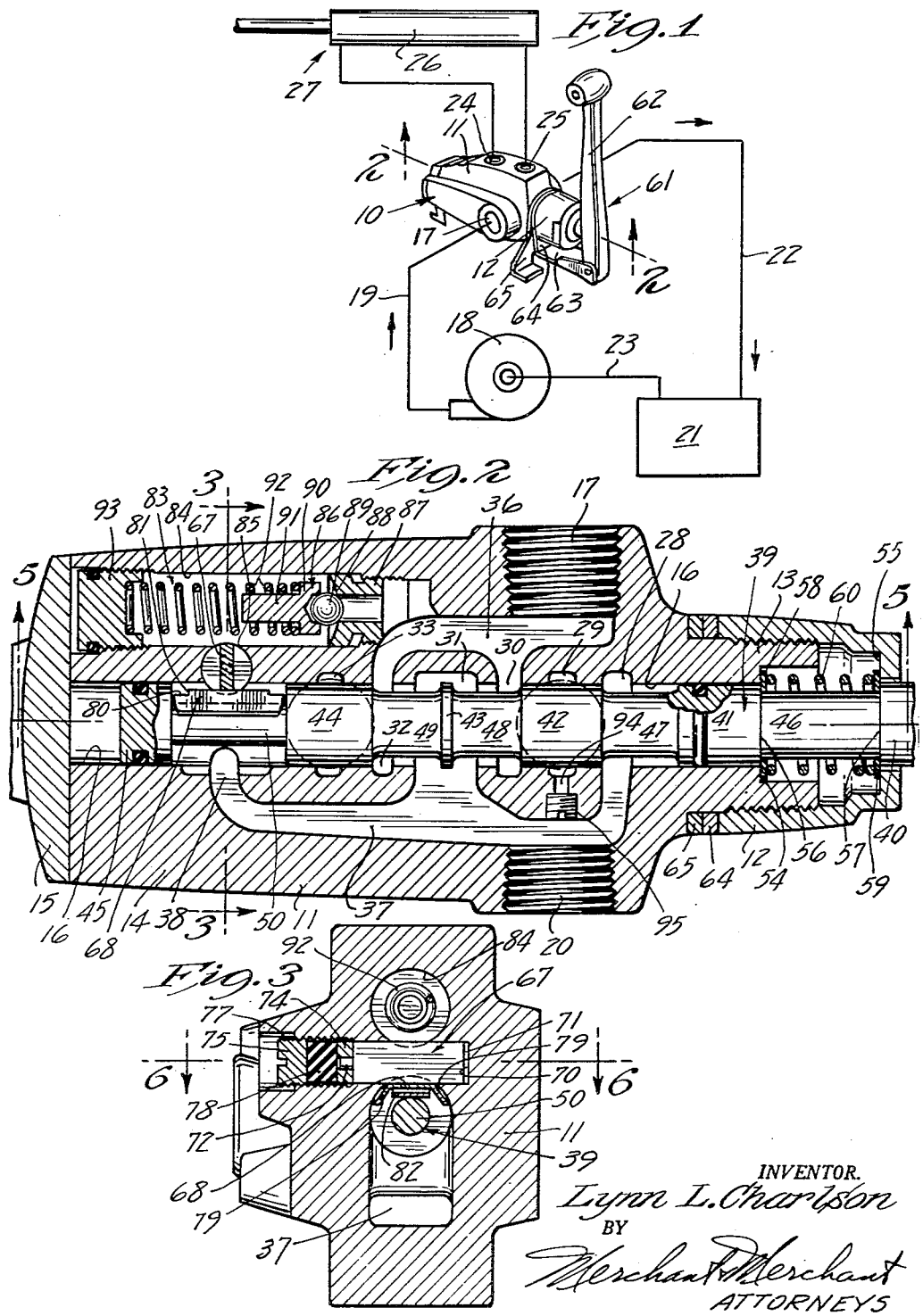
INVENTOR.
Lynn L. Charlson
BY
Merchant & Merchant
ATTORNEYS July 30, 1957     L. L. CHARLSON     2,800,922
HYDRAULIC VALVE
Filed Feb. 15, 1955     2 Sheets-Sheet 2

INVENTOR.
Lynn L. Charlson
BY
Merchant & Merchant
ATTORNEYS

United States Patent Office 2,800,922
Patented July 30, 1957

2,800,922
HYDRAULIC VALVE

Lynn L. Charlson, Minneapolis, Minn.

Application February 15, 1955, Serial No. 488,297

15 Claims. (Cl. 137—622.5)

My invention relates to hydraulic valves; and in particular, it relates to a valve for controlling the flow of fluid under pressure to the cylinder of a hydraulic motor, either a double or a single-acting system.

An object of my invention is to provide a novel and improved valve of the class described which, after being opened, is self-holding until a predetermined pressure is reached in the system, at which time the valve is automatically returned to closed position.

Another object of my invention is to provide, in a valve of the class described in the preceding object, a novel and improved latching mechanism optionally movable between a latching position and a nonlatching position; whereby, at one position of the latching mechanism, the valve is self-holding in an operative position until a predetermined pressure is reached in the system, and at the other position of the latching mechanism the valve must be held in its operative position.

Another object of my invention is to provide a valve for controlling the flow of fluid under pressure to the opposite ends of the cylinder of a hydraulic motor, in a double-acting system, which is movable from a neutral position in one direction to one operative position and in the opposite direction to another operative position and which provides improved return means for normally maintaining said valve in its neutral position and for urging the valve from either of its operative positions to its neutral position.

Another object of my invention is to provide a novel and improved valve for controlling the flow of fluid under pressure to the opposite ends of the cylinder of a hydraulic motor, in a double-acting system, which may be easily and simply adapted for use in a single-acting system.

Other objects of my invention are to provide a novel and improved valve of the class described which is of simple and rugged construction, easily and simply operated, and safe and reliable in operation, and which is designed and constructed to be easily and inexpensively adapted to suit a variety of individual requirements.

These and other objects and advantages of my invention will become apparent in the course of the following specification and claims, reference being made to the accompanying drawings, wherein:

Fig. 1 is a view partly in perspective and partly schematically showing my invention in operative relation with a fluid pressure system;

Fig. 2 is an enlarged view partly in vertical section and partly in elevation, with some parts broken away, taken substantially on the line 2—2 of Fig. 1;

Fig. 3 is a view partly in vertical section and partly in elevation taken substantially on the line 3—3 of Fig. 2;

Figure 4:
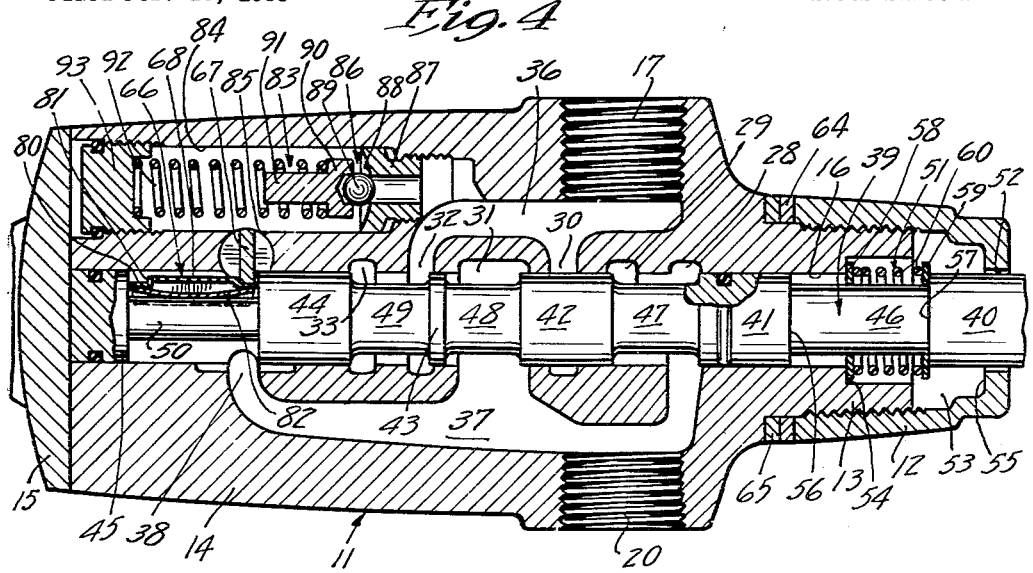
Fig. 4 is a view similar to Fig. 2 showing some of the parts thereof in different positions.

Referring more particularly to the drawings, wherein like parts will be indicated by the same numeral, my novel and improved valve, indicated in its entirety by the numeral 10, comprises a valve housing 11 having a removable head section 12 threaded on the end 13 of a main housing portion 14 and a slidably removable foot end portion 15. Main body portion 14 of valve housing 11 is bored to define an internal cylindrical cavity 16. Body portion 14 of housing 11 has an inlet port 17 formed therein which is adapted to be connected to a source of fluid pressure, and in particular the high pressure side of a fluid pump 18, Fig. 1, by piping, shown schematically in Fig. 1 and indicated by the numeral 19. Housing 11 has an outlet port 20 which is adapted to be connected to a reservoir of fluid 21 by piping shown schematically in Fig. 1 and indicated by the numeral 22.

Communication between fluid reservoir 21 and the low pressure side of pump 18 is effected through piping indicated by the numeral 23 in Fig. 1. Housing 11 has a pair of cylinder ports, indicated by the numerals 24 and 25 which are adapted to be connected to the opposite ends of the cylinder 26 of a hydraulic motor, shown schematically in Fig. 1 and indicated generally by the numeral 27.

The cylindrical cavity 16 is annularly recessed at various axially spaced places to define axially spaced openings 28, 29, 30, 31, 32 and 33 into the cavity 16. Two independent generally radially outwardly extending passages 34 and 35 are formed in the valve housing 11; the former in communication with cylinder port 24 communicates with opening 33 and the latter in communication with cylinder port 25 communicates with opening 29. Housing 11 has a pair of passages, indicated generally by the numerals 36 and 37. Passage 36 connects inlet port 17 to openings 30 and 32 and passage 37 connects outlet port 20 to openings 28 and 31. Passage 37 extends generally from its connection with opening 31 to communicate with a port opening into cavity 16, indicated by the numeral 38, at a place intermediate opening 33 and end portion 15 of housing 11.

A valve spool 39 is mounted in cylindrical cavity 16 for axial movements, and is preferably provided with land portions 40, 41, 42, 43, 44 and 45, which block fluid flow through the cavity 16, and with reduced portions 46, 47, 48, 49 and 50 which permit fluid flow through the cavity. Land portions 40—45 form connected pistons operating in cylindrical cavity 16, in a reciprocating piston valve arrangement, which are adapted to traverse the axially spaced openings 28 through 33 into the cavity 16; and reduced portions 46 through 50 form connecting links between the land portions 40—45. It is clear that valve spool 39 might be formed in a manner other than as specifically shown to accomplish the same result; for example, individual piston portions might be anchored by locking nuts in proper relationship on a longitudinally extending rod for common axial movements therewith.

Land portion 43 is axially extended, or has a length which is less than that of opening 31. Opening 31 is generally centrally disposed with respect to cavity 16, and openings 30 and 32 are next adjacent opening 31 but axially spaced therefrom on opposite sides thereof. The length of land portion 43 is also less than the axial distance between opening 31 and each of the openings 30 and 32. Reduced portions 48 and 49 of valve spool 39 are disposed on opposite sides of land portion 43 and each extend axially therefrom to land portions 42 and 44, respectively. Land portions 42 and 44 are axially spaced a distance greater than, and preferably substantially equal to, the axial distance between far limits of openings 30 and 32, but are spaced a distance less than the axial distance between openings 29 and 33, the former being next adjacent but axially spaced from opening 30 on the opposite side thereof from opening 31, and the latter being next adjacent but axially spaced from opening 32 on the opposite side thereof from opening 31. Land portions 42 and 44 extend axially, or have a length, greater than openings 29 and 33.

Figure 5:
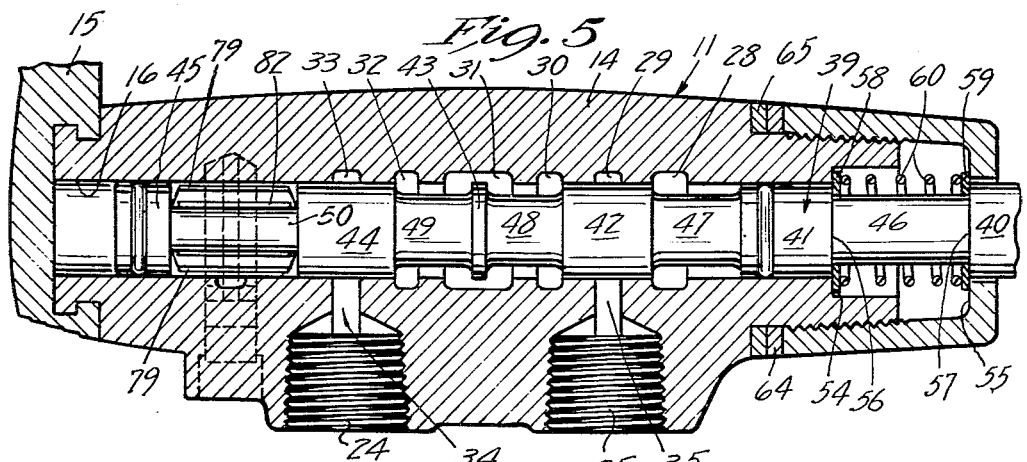
Fig. 5 is a view partly in horizontal section and partly in plan taken substantially on the line 5—5 of Fig. 2.

Valve spool 39 is axially movable from a neutral position, shown in Figs. 2 and 5, in one direction to one operative position, shown in Fig. 4, and in the opposite direction to a second operative position, not specifically shown in the drawings. Land portion 43 is disposed in cavity 16 for axial movements between openings 30 and 32 during the movements of spool 39 between its neutral position and operative positions. At the neutral position of valve spool 39, land portion 43 is disposed generally centrally in opening 31 and reduced portions 48 and 49 extend therefrom to the far limits of openings 30 and 32, respectively, to be disposed generally between openings 30 and 31 and between openings 31 and 32, respectively. Thus, at the neutral position of valve spool 39, opening 31 is in communication with the openings 30 and 32 through the cavity 16 past the reduced portions 48 and 49; whereby, inlet port 17 is in communication with outlet port 20 through their respective passages 36 and 37, the latter in communication with the openings 30 and 32 and the former in communication with opening 31. Land portions 42 and 44 extend axially from their connections with reduced portions 48 and 49, respectively, the former a distance greater than the axial distance between opening 30 and the far limit of opening 29, and the latter a distance greater than the axial distance between opening 32 and the far limit of opening 33, to be disposed at the neutral position of the valve spool 39, one to block the opening 29 and the other to block the opening 33.

Thus, in recapitulation, the land and reduced portions of the valve spool 39 are disposed at the neutral position thereof so that inlet port 17 and outlet port 20 are in communication and so that communication is blocked from inlet port 17 and outlet port 20 to the cylinder ports 24 and 25.

Valve spool 39 is moved from its neutral position toward foot end portion 15, that is, to the left referring to Figs. 2 and 5, to the position shown in Fig. 4 to move it from its neutral position to one operative position. Referring now in particular to Fig. 4, land portion 43 is disposed generally between openings 31 and 32 to block communication therebetween at this operative position of the spool 39; land portion 44 is disposed beyond the limits of opening 33 and it blocks communication between opening 33 and port 38, the latter being in communication with outlet port 20; reduced portion 49 is disposed between openings 32 and 33 to provide communication between these openings through cavity 16; land portion 42 is disposed to extend generally from opening 31 to beyond the far limits of opening 30 to be disposed generally between openings 31 and 29 which blocks communication between opening 30 and openings 29 and 31 disposed on opposite sides thereof; and reduced portion 47, which connects land portions 41 and 42, extends axially a distance substantially equal to the axial distance between the far limits of openings 28 and 29 to be disposed generally between openings 28 and 29 so that they are in communication through cavity 16. In recapitulation, passage 37 extends from outlet port 20 to openings 28 and 31 and port 38; port 38 is blocked from communication with the adjacent opening 33 by land portion 44, opening 31 is blocked from communication with the adjacent openings 30 and 32 by land portions 42 and 43, respectively, and opening 28 is in communication with opening 29 past reduced portion 47 through the cavity 16. Thus, outlet port 20 is in communication with cylinder port 25. Passage 36 extends from inlet port 17 to openings 30 and 32; opening 30 is blocked from communication with the adjacent openings 29 and 31 by land portion 42; and opening 32 is blocked from communication with opening 31 by land portion 43 but is in communication with opening 33 past reduced portion 49 through the cavity 16. Thus, inlet port 17 is in communication with cylinder port 24.

Thus, in further summary, the land and reduced portions of the valve spool 39 are disposed at one operative position thereof so that inlet port 17 is in communication with cylinder port 24 and outlet port 20 is in communication with cylinder port 25 and so that communication is blocked between inlet port 17 and outlet port 20.

Valve spool 39 is moved from its neutral position in the direction away from foot end portion 15, that is, to the right referring to Figs. 2 and 5, to its second operative position. At this second operative position, land 43 is disposed generally between openings 31 and 30 to block communication therebetween; land portion 42 is disposed beyond the limits of opening 29 and is generally centrally disposed with respect to opening 28 so that it blocks communication between openings 28 and 29, the latter being in communication with opening 30 past reduced portion 48 through the cavity 16; land portion 44 is disposed to extend generally from the opening 31 to opening 33 and is generally centrally disposed with respect to opening 32 which blocks communication between opening 32 and openings 31 and 33 disposed on opposite sides thereof; and reduced portion 50, which connects land portions 44 and 45 extends axially a distance substantially equal to the axial distance between opening 33 and port 38 to be disposed generally between opening 33 and port 38 so that they are in communication through cavity 16. In recapitulation, passage 37 extends from outlet port 20 to openings 28 and 31 and port 38; opening 28 is blocked from communication with the adjacent opening 29 by land portion 42, opening 31 is blocked from communication with the adjacent openings 30 and 32 by land portions 43 and 44, respectively, and port 38 is in communication with opening 33 past reduced portion 50 through the cavity 16. Thus, outlet port 20 is in communication with cylinder port 24. Passage 36 extends from inlet port 17 to openings 30 and 32; opening 32 is blocked from communication with the adjacent openings 31 and 33 by land portion 44, and opening 30 is blocked from communication with opening 31 by land portion 43 but is in communication with opening 29 past reduced portion 48 to the cavity 16. Thus, inlet port 17 is in communication with cylinder port 25.

In further summary, at this second operative position of valve spool 39, the land and reduced portions thereof are disposed so that inlet port 17 is in communication with cylinder port 25 and outlet port 20 is in communication with cylinder port 24 and so that communication is blocked between inlet port 17 and outlet port 20.

I provide return means, indicated generally by the numeral 51 for maintaining valve spool 39 at its neutral position and for automatically returning the pool to its neutral position from either of its operative positions upon release of the actuating force moving the spool 39 in either direction from its neutral position or upon the release of any restraining force maintaining the spool 39 in either of its operative positions. Referring in particular to Figs. 2, 4 and 5, head section 12 is formed with a central aperture 52 of substantially the same bore as cavity 16, and for the purpose of this disclosure may be considered a continuation of and part of cavity 16. Valve spool 39 extends through aperture 52 out of the housing 11. Housing 11 is radially recessed from cavity 16, as indicated by the numeral 53, to form a pair of axially spaced housing shoulders 54 and 55 which project generally radially outwardly from the cavity 16, the former being formed by housing portion 14 and the latter by head section 12. Reduced portion 46 of valve spool 39 intermediate land portions 40 and 41 provide a pair of spool shoulders 56 and 57. Reduced portion 46 extends axially a distance approximating the distance between housing shoulders 54 and 55 so that spool shoulders 56 and 57 are axially spaced a distance generally equal to the axial distance between housing shoulders 54 and 55. A pair of washer-like elements 58 and 59 are mounted on reduced portion 46 for axial movements relative thereto between spool shoulders 56 and 57 and are disposed between housing shoulders 54 and 55 with washer-like element 58 associated with an engaging housing shoulder 55 at its limit of movement in a direction away from shoulder 55 and with washer-like element 59 engaging housing shoulder 55 at its limit of movement in a direction away from shoulder 54. A coiled compression spring 60 encompasses reduced portion 46 and is positioned between washer-like elements 58 and 59 to urge them in opposite directions. Spring 60 urges valve spool 39 to its neutral position wherein washer-like element 58 engages housing shoulder 54 and spool shoulder 56 and washer element 59 engages housing shoulder 55 and spool shoulder 57. It is clear that the movement of valve spool 39 from its neutral position to either of its operative positions moves the spool a distance less than the maximum distance between washer-like elements 58 and 59, which would be the spacing between washer-like elements 58 and 59 at the neutral position of valve spool 39. Movement of valve spool 39 from its neutral position to its first defined operative position, as shown in Fig. 4, moves spool shoulder 57 away from housing shoulder 55 toward housing shoulder 54 and therewith moves washer-like element 59 from its engagement with housing shoulder 55 against the bias of spring 60 towards washer-like element 58 which is maintained in engagement with housing shoulder 54. Similarly, movement of valve spool 39 from its neutral position in the opposite direction to its second defined operative position, moves spool shoulder 56 away from housing shoulder 54 and toward housing shoulder 55 and therewith moves washer-like element 58 from its engagement with housing shoulder 54 against the bias of spring 60 towards washer-like element 59. It is clear that the movement of one washer-like element 58 or 59 toward the other compresses spring 60 to set up a restoring force which automatically returns valve spool 39 back to its neutral position upon the release of the actuating force moving the valve spool 39 in either direction or upon the release of any restraining force, maintaining the valve spool at either of its operative positions.

Referring in particular to Fig. 1, I provide means, indicated generally by the numeral 61, for moving valve spool 39 against the bias of return means 51 from its neutral position to either of its operative positions. Preferably, means 61 comprises a lever arm 62 pivotally connected intermediate its ends to valve spool 39 axially outwardly of housing 11 and pivotally connected at one end to a generally L-shaped bracket 63 for movement generally toward and away from housing 11. Bracket 63 may be rigidly anchored to housing 11 in any position 360° about the axis of valve spool 39 which is suitable to the operator by means of washer-like portion 64 thereof which encompasses end portion 13 of housing portion 14 axially inwardly of the threaded portion thereof. A mounting bracket 65 likewise may be positioned 360° about the axis of valve spool 39 in any position suitable to the operator; and it and washer portion 64 of bracket 63 are disposed between housing portion 14 and head section 12 and are rigidly held in position by tightening the threaded head section 12. Arm 62 is generally disposed at right angles to valve spool 39 at the neutral position of the latter, and swinging movements of arm 62 about its end connected to bracket 63 from this right angle position towards housing 11 moves valve spool 39 from its neutral position to its operative position shown in Fig. 4 and swinging movements of arm 62 from its right angle position generally away from housing 11 moves valve spool 39 from its neutral position to its second operative position.

Figure 6:
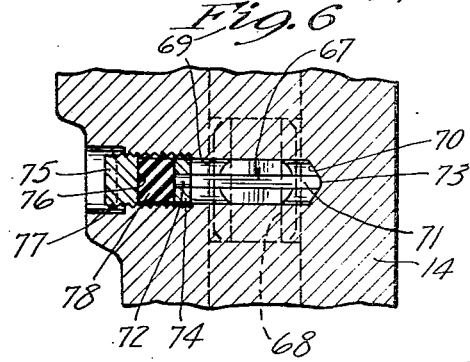
Fig. 6 is a fragmentary detail view in horizontal section taken substantially on the line 6—6 of Fig. 3.

I provide latching means, indicated generally and in its entirety by the numeral 66, for holding valve spool 39 at each of its operative positions, until released by means subsequently described. Latching means 66 comprises two cooperating latching elements 67 and 68. Preferably, housing 11 has a generally cylindrical passage 69 formed therein which is generally radially outwardly disposed with respect to cavity 16 but which intersects the latter at right angles thereto slightly inwardly of the outward radial limits thereof. Passage 69 terminates in housing 11 in a generally wedge-shaped portion 70, Fig. 6, which will be subsequently mentioned in more detail. Latching element 67 is a pawl-like element, and more specifically, a generally chisel-shaped pawl having a generally V-edged end 71 and oppositely disposed therefrom a spindle-shaped end 72. Pawl or pawl-like element 67 is mounted in passage 69 to be disposed in radially outwardly spaced spanned relation with reduced portion 50 of valve spool 39 with its end 71 adjacent portion 70 of passage 69. That portion of housing 11 bordering wedge-shaped portion 70 of passage 69 defines cam means, more specifically a cam surface, indicated by the numeral 73. Spindle end 72 of pawl 67 is journaled in a bushing 74 for rotation; and bushing 74 is mounted in passage 69 for longitudinal movements. Means comprising an adjusting screw 75 defines an abutment 76 which is disposed within passage 69 longitudinally outwardly spaced from pawl 67 for longitudinal movements toward and away from pawl 67. Means comprising external threads 77 formed on adjusting screw 75 connect the latter to housing 11 to releasably maintain abutment 76 in various rigidly fixed positions with respect to housing 11; and in particular, two positions. A resilient yieldable member 78 is disposed in passage 69 between bushing 74 and abutment 76. Resilient yieldable member 78 is preferably variable between a compressed position and an expanded position dependent upon the position of abutment 76 for urging pawl 67 toward cam surface 73 to its limit of movement in that direction, wherein pawl 67 abuts cam surface 73 at the terminal end of passage 69, by force variable between two specific limits determined by whether resilient member 78 is in its compressed position or expanded position. The longitudinal position of pawl 67 at the terminal end of passage 69, wherein V-shaped end 71 of pawl 67 closely interfits the wedge-shaped portion 70 of passage 69, defines a locked position of pawl 67. Cam surface 73 at this locked position of pawl 67 maintains the latter in rotational position wherein it is in radially disposed relation with respect to spool 39, which defines the latched position of pawl 67. Pawl 67 is longitudinally outwardly movable away from cam surface 73 from its locked position against the bias of resilient member 78 to permit rotational movement thereof from a latched position to an unlatched position. The longitudinal position of pawl 67 wherein it is freely rotatable in bushing 74 from its radially disposed latched position to its unlatched position is defined as its releasable position. Cam surface 73 in engagement with pawl 67 rotates the latter from its nonlatching position to its latching position upon longitudinal movement thereof from its releasable position to its locked position. Pawl 67 in its locked position is disposed in engagement with cam surface 73 so that torque applied to pawl 67 tends to move the latter longitudinally from its locked position to its releasable position.

In recapitulation, pawl 67 is mounted in passage 69 for longitudinal movements generally at right angles to valve spool 39 between a locked position and a releasable position and for rotational movements between a latching position and a nonlatching position. Cam surface 73 and resilient member 77, which is variable between a compressed and an expanded position, comprise variable control means for controlling the rotational position of pawl 67 in relation to its longitudinal position, and for controlling the longitudinal movements of pawl 67. Adjusting screw 75 comprises means for controlling the position of variable resilient member 78 and thereby comprises means for controlling the variation of the aforementioned control means. The specific positioning of adjusting screw 75 to properly control resilient member 78 will be more specifically referred to following a more complete description of latching element 68.

Latching element 68 is a ratchet element adapted to cooperate with pawl 67 for maintaining valve spool 39 at its operative positions. Latching element 68 is a generally flat longitudinally extending shuttle having a length substantially equal to the axially extended length of reduced portion 50 of valve spool 39 and having a width which approximates the diameter of cylindrical cavity 16. Ratchet element 68 is formed with generally inturned longitudinally extending side portions 79 so that it approaches an arcuate shape to generally conform to the contours of cylindrical cavity 16 and valve spool 39; and ratchet element 68 is formed with offset end portions 80 to define abutments 81. Ratchet 68 is mounted on reduced portion 50, disposed adjacent pawl 67 generally radially inwardly with respect thereof, for longitudinal movements in common with axial movements of valve spool 39 and for limited radial movements with respect thereto toward and away from valve spool 39. A resilient member, preferably comprising a leaf spring 82, is disposed between reduced portion 50 of valve spool 39 and ratchet element 68 to urge ratchet element 68 generally radially outwardly with respect to valve spool 39 into engagement with pawl 67. At its locked and latched position, pawl 67 is radially disposed with respect to valve spool 39; and when valve spool 39 is at its neutral position, pawl 67 is disposed generally centrally with respect to ratchet element 68, as shown in Fig. 2. At the aforementioned positions of pawl 67 and valve spool 39, abutments 81 are axially spaced from pawl 67 a distance substantially equal to the extent of movement of spool 39 between its neutral and operative positions. The extent of movement of spool 39 from its neutral position to one operative position is substantially the same as its extent of movement from its neutral position to the other operative position. Thus, movement of valve spool 39 from its neutral position, Fig. 2, to either of its operative positions permits radially outward movement of abutments 81 into latching relationship with pawl 67, Fig. 4, one abutment 81 in latching relationship with pawl 67 at one operative position and the other in latching relationship with pawl 67 at the second operative position of valve spool 39.

When valve spool 39 is in either of its operative positions, return means 51 urges the spool back to its neutral position and urges the abutment 81 which is in latching relationship with pawl 67 into engagement therewith to apply a rotational force or torque to pawl 67. If pawl 67 is maintained at its locked position and latching position by a force sufficiently great enough to counteract the aforementioned torque or rotational force applied thereto, pawl 67 and ratchet element 68 will be maintained in latched relationship to hold valve spool 39 at its operative position until ratchet element 68 is moved radially inwardly to permit longitudinal movement thereof with respect to pawl 67; however, if pawl 67 is maintained at its locked position and latching position by a force which is less than or cannot counteract the aforementioned rotational force or torque applied thereto, abutment 81 will move pawl 67 longitudinally to its releasable position against the bias of the force tending to hold it at its locked position and latching position, resilient member 78, and to its unlatched position, whereby ratchet element 68 is able to move longitudinally with respect to pawl 67 without radially inward movement thereof; and ratchet element 68 and pawl 67 are ineffective to maintain valve spool 39 at its operative position. Thus, resilient member 78 is disposed at its compressed position to urge pawl 67 to its locked position with a force sufficient to maintain it at its locked position against the force of return means 51, so that pawl 67 in engagement with ratchet element 68 is effective to maintain spool 39 at either of its operative positions; and resilient member 78 at its expanded position urges pawl 67 to its locked position by a force which is unable to maintain it at its locked position against the force of return means 51 which permits the movement of pawl 67 to its releasable position and its non-latching position by the force of return means 51 so that pawl 67 is ineffective to maintain spool 39 in either of its operative positions. The variation of resilient member 78 between its expanded and compressed positions is effected by the longitudinal movement of abutment 76 which is effected by the adjustment of adjusting screw 75 between two positions.

It is clear that ratchet element 68 might be formed in other ways than as specifically shown and might simply and easily be changed to meet individual requirements; for example, it might be formed with only one abutment 81 so that latching mechanism 66 would be effective to hold valve spool 39 at only one operative position and it would have to be manually held at its other operative position.

I provide means indicated generally by the reference numeral 83 responsive to the pressure in the connected passages between inlet port 17 and either of the cylinder ports 24 and 25 at either of the operative positions of valve spool 39 for moving latching element or ratchet element 68 out of latched engagement with the other element or pawl 67 when the pressure in the aforementioned passages reaches a predetermined value, whereby valve spool 39 is returned to its neutral position by return means 51. Specifically and preferably, the aforementioned means 83 comprises a passage 84 formed in housing 11 and extending from passage 36 to the end of housing portion 14 adjacent foot end portion 15. Passage 84 intersects passage 69 at a place indicated by the numeral 85 to provide communication therebetween for admitting fluid from passage 84 through passage 69, past pawl 67, into cavity 16 adjacent the radially outwardly disposed side of ratchet element 68. A check valve, indicated in its entirety by the numeral 86 is disposed in passage 84 between passage 36 and place 85 and comprises a bushing element 87 anchored to the housing 11 by threads and defining a valve seat 88, a ball check valve 89, and a valve-retaining member 90 having a stem 91. A resilient member 92, comprising a coiled compression spring, is disposed between valve-retaining member 90, encompassing the stem 91 thereof, and an adjusting screw 93 to urge ball 89 in engagement with seat 88. Ball 89 is moved from its seat 88 against the bias of spring 82 to permit fluid flow from passage 36 through passage 84 to passage 69 by a predetermined pressure controlled by the position of adjusting screw 93. It should be noted that port 38 communicates with cavity 16 adjacent reduced portion 50 of valve spool 39 on the opposite side of ratchet element 68 from passage 69. Port 38 is in communication with outlet valve 20 which is in communication with fluid reservoir 21 or the low pressure side of the system, so that when fluid at the aforementioned predetermined value is admitted past valve 86 to passage 69, the pressure differential on opposite sides of ratchet element 68 moves the latter radially inwardly to release engagement of one of the abutments 81 with pawl 67 and thereby permit the return of valve spool 39 from one of its operative positions to its neutral position. Thus, when valve spool 39 is at either of its operative positions, fluid pressure is admitted from pump 18 through valve 19 to one end of the cylinder 26 of the hydraulic motor 27; and when this reaches the end of its stroke, the predetermined pressure sufficient to actuate valve 86 will be built up in the interconnected passages between inlet valve 17 and either of the cylinder ports 24 or 25, one cylinder port at one operative position and the other at the other operative position, and this will move ratchet element 68 radially inwardly, as aforementioned, to permit valve spool 39 to automatically return to its neutral position. Valve 86 also acts as a pressure relief valve to automatically return valve spool 39 to its neutral position should pressure within the system tend to exceed the predetermined pressure which is sufficient to actuate valve 86. Foot end portion 15 normally encloses adjusting screw 93 so that it cannot be inadvertently moved, as this would change the adjustment of valve 86; however, the pressure at which valve 86 will be opened may be changed by removing foot end portion 15 and adjusting the position of adjusting screw 93.

Housing 11 is provided with a passage 94 which extends generally radially outwardly from opening 29 to passage 37. Passage 94 is normally closed by a valve screw 95, which is disposed generally radially inwardly from outlet port 20 when my valve 10 is used in a double-acting system as explained in the foregoing disclosure. If it is desired to use my invention in a single-acting system, an externally threaded plug, not shown in the drawings, may be inserted in cylinder port 25, and only cylinder port 24 will extend to the cylinder 26 of hydraulic motor 27. At the previously defined second operative position of valve spool 39, inlet port 17 is in communication with cylinder port 25, now that cylinder port 25 has been plugged it is essential that the fluid pressure from inlet port 17 be diverted to the outlet port 20. This is accomplished by removing valve screw 95 to open passage 94. Valve screw 95 may be latched through outlet port 20 for easily removing it.

My invention has been built and tested and found to accomplishe all of the aforementioned objects and advantages. It will be obvious to those skilled in the art that my invention may be modified by many substitutions and equivalents in that this disclosure is intended to be illustrative only to disclose a preferred and commercial embodiment thereof; therefore, I intend to be limited solely by the scope of the appended claims.

What I claim is:

1. In a hydraulic valve, a valve housing defining an internal cylindrical cavity, said housing having an inlet port adapted to be connected to a source of fluid pressure and a cylinder port adapted to be connected to one end of the cylinder of a hydraulic motor, said housing having a pair of independent passages in communication one with said inlet port and the other with said cylinder port and communicating with axially spaced openings into said cavity, a valve spool mounted in said cavity for axial movement between a neutral and an operative position, said spool being disposed at its neutral position whereby communication between said openings is blocked by said spool and being disposed at its operative position whereby said axially spaced openings are in communication through said cavity and said inlet port is in communication with said cylinder port, resilient return means urging said spool from its operative position to its neutral position, means for moving said spool against the bias of said return means from its neutral position to its operative position, latching means for holding said spool at its operative position until released comprising two cooperating latching elements, one being mounted in the housing in generally radially outwardly spaced relation to a portion of said spool and in generally fixed relation with respect to axial movements thereof and the other being mounted on the spool adjacent said one latching element generally radially inwardly with respect thereto for common movements with said spool, and for limited generally radial movements with respect thereto toward and away from said one latching element, resilient means urging said other latching element towards said one latching element and into latched relationship therewith at the operative position of the spool, and means responsive to the pressure in the connected passages between said inlet port and cylinder port at the operative position of the spool for moving said other latching element out of latched engagement with said one latching element when said pressure reaches a predetermined value whereby said spool is returned to its neutral position by said return means.

2. In a hydraulic valve, a valve housing defining an internal cylindrical cavity, said housing having an inlet port adapted to be connected to a source of fluid pressure and a cylinder port adapted to be connected to one end of the cylinder of a hydraulic motor, said housing having a pair of independent passages in communication one with said inlet port and the other with said cylinder port and communicating with axially spaced openings into said cavity, a valve spool mounted in said cavity for axial movement between a neutral and an operative position, said spool being disposed at its neutral position whereby communication between said openings is blocked by said spool and being disposed at its operative position whereby said axially spaced openings are in communication through said cavity and said inlet port is in communication with said cylinder port, resilient return means urging said spool from its operative position to its neutral position, means for moving said spool against the bias of said return means from its neutral position to its operative position, latching means for holding said spool in its operative position until released comprising two cooperating latching elements, means mounting one of said latching elements in the housing in generally radially outwardly spaced relation to a portion of said spool for movement with respect to the spool between a latching position and a nonlatching position, the other latching element being mounted on the spool adjacent said one latching element generally radially inwardly with respect thereto for common movements with said spool and for limited radial movements with respect thereto toward and away from said one latching element, resilient means urging said other latching element toward said one latching element, said other latching element being radially movable into latching engagement with said one latching element when the latter is in its latching position and the spool is in its operative position, and means responsive to the pressure in the connected passages between said inlet port and cylinder port at the operative position of the spool for moving said other latching element against the bias of said resilient means out of latched engagement with said one latching element when said pressure reaches a predetermined value whereby said spool is returned to its neutral position by said return means.

3. In a hydraulic valve, a valve housing defining an internal cylindrical cavity, said housing having an inlet port adapted to be connected to a source of fluid pressure and a cylinder port adapted to be connected to one end of the cylinder of a hydraulic motor, said housing having a pair of independent passages in communication one with said inlet port and the other with said cylinder port and communicating with axially spaced openings into said cavity, a valve spool mounted in said cavity for axial movement between a neutral and an operative position, said spool being disposed at its neutral position whereby communication between said openings is blocked by said spool and being disposed at its operative position whereby said axially spaced openings are in communication through said cavity and said inlet port is in communication with said cylinder port, resilient return means urging said spool from its operative position to its neutral position, means for moving said spool against the bias of said return means from its neutral position to its operative position, latching means for holding said spool at its operative position until released comprising a pawl-like element and a ratchet element, means mounting the former in the housing in generally radially outwardly spaced relation to a portion of the spool and in generally fixed relation with respect to axial movements of the spool, said ratchet element being mounted on the spool adjacent said pawl-like element generally radially inwardly with respect thereto for common movements with said spool and for limited generally radial movements with respect thereto toward and away from said pawl-like element, a leaf spring disposed between said pawl-like element and said ratchet element urging the latter toward said pawl-like element and into latched relationship therewith at the operative position of the spool, and means responsive to the pressure in the connected passages between said inlet port and cylinder port at the operative position of the spool for moving said ratchet element against the bias of said leaf spring out of latched engagement with said pawl-like element when said pressure reaches a predetermined value whereby said spool is returned to its neutral position by said return means.

4. In a hydraulic valve, a valve housing defining an internal cylindrical cavity, said housing having an inlet port adapted to be connected to a source of fluid pressure and a cylinder port adapted to be connected to one end of the cylinder of a hydraulic motor, said housing having a pair of independent passages in communication one with said inlet port and the other with said cylinder port and communicating with axially spaced openings into said cavity, a valve spool mounted in said cavity for axial movement between a neutral and an operative position, said spool being disposed at its neutral position whereby communication between said openings is blocked by said spool and being disposed at its operative position whereby said axially spaced openings are in communication through said cavity and said inlet port is in communication with said cylinder port, resilient return means urging said spool from its operative position to its neutral position, means for moving said spool against the bias of said return means from its neutral position to its operative position, latching means for holding said spool at its operative position until released comprising a pawl-like element and a ratchet element, means mounting the former in the housing in generally radially outwardly spaced relation to a portion of the spool and in generally fixed relation with respect to axial movements of the spool, said ratchet element being disposed generally between said pawl-like element and said spool and mounted on the spool for movements therewith and for limited radial movements with respect thereto toward and away from said pawl-like element, a leaf spring disposed between said spool and said ratchet element urging the latter generally radially outwardly with respect to said spool into engagement with said pawl-like element at the neutral position of the spool and during movements of the spool between its neutral and operative positions, said ratchet element defining a radially inwardly projecting abutment axially spaced from said pawl-like element at the neutral position of the spool in a direction opposite to the direction of movement of the spool from its neutral to its operative position a distance substantially equal to the extent of movement of the spool between its neutral and operative positions whereby said abutment is radially outwardly movable with respect to the spool at the operative position thereof into latched relationship with said pawl-like element to retain said spool at its operative position, and means responsive to the pressure in the connected passages between said inlet port and cylinder port at the operative position of the spool for moving said ratchet element generally radially inwardly against the bias of said leaf spring when said pressure reaches a predetermined value whereby to release said abutment from latching relationship with said pawl-like element and permit said return means to return the pawl to its neutral position.

5. The structure defined in claim 4 in which said last-mentioned means comprises a check valve-equipped passage extending from one of said pair of independent passages to communicate with said cavity adjacent said ratchet element for admitting fluid at the operative position of the spool from the connected passages between said inlet and cylinder ports to said ratchet element when the pressure of said fluid reaches a predetermined value.

6. In a hydraulic valve, a valve housing defining an internal cylindrical cavity, said housing having an inlet port adapted to be connected to a source of fluid pressure and a cylinder port adapted to be connected to one end of the cylinder of a hydraulic motor, said housing having a pair of independent passages in communication one with said inlet port and the other with said cylinder port and communicating with axially spaced openings into said cavity, a valve spool mounted in said cavity for axial movement between a neutral and an operative position, said spool being disposed at its neutral position whereby communication between said openings is blocked by said spool and being disposed at its operative position whereby said axially spaced openings are in communication through said cavity and said inlet port is in communication with said cylinder port, resilient return means urging said spool from its operative position to its neutral position, means for moving said spool against the bias of said return means from its neutral position to its operative position, said housing having a passage intersecting said cylindrical cavity generally at right angles thereto, a pawl-like element mounted in said passage in radially outwardly spaced spanned relation with a portion of said spool for longitudinal movements generally at right angles with respect to the spool between a locked position and a releasable position and for rotational movements between a latching and a nonlatching position, variable control means for controlling the rotational position of said pawl-like element in relation to its longitudinal position whereby longitudinal movement of said pawl-like element from its releasable to its locked position moves said pawl from its nonlatching to its latching position and movement of said pawl-like element from its locked position to its releasable position permits rotational movement thereof from its latched to its nonlatching position, said means being variable between two positions for controlling the movements of said pawl-like element whereby at one position thereof said pawl-like element is maintained at its locked position and thereby its latching position against the force of said return means so that said pawl-like element may be effective to maintain said spool at its operative position and whereby at its other position said control means permits the movement of said pawl-like element to its releasable position and its nonlatching position by the force of said return means tending to return said spool from its operative to its neutral position so that said pawl-like element is ineffective to maintain said spool at its operative position, means for controlling the variation of said control means between its two positions, a ratchet element disposed generally between said pawl-like element and said spool and mounted on the spool for movements therewith and for limited radial movements with respect thereto toward and away from said pawl-like element, a leaf spring disposed between said spool and said ratchet element urging the latter generally radially outwardly with respect to said spool into engagement with said pawl-like element at the neutral position of the spool and during the movements of the spool between its neutral and operative positions, said ratchet element defining an abutment axially spaced from the axis of rotation of said pawl-like element at the neutral position of the spool in a direction opposite to the direction of movement of the spool from its neutral to its operative position a distance substantially equal to the extent of movement of the spool between its neutral and operative positions whereby said abutment is radially outwardly movable with respect to the spool at the operative position thereof, said abutment at the operative position of the spool being disposed in latched relationship with said pawl-like element when the latter is in its latching position to retain said spool at its operative position, and means responsive to the pressure in the connected passages between said inlet port and cylinder port at the operative position of the spool for moving said ratchet element generally radially inwardly against the bias of said leaf spring when said pressure reaches a predetermined value whereby to release said abutment from latching relationship with said pawl-like element and permit said return means to return the pawl to its neutral position.

7. The structure defined in claim 6 in which said variable control means comprises cam means and variable resilient means disposed in the same passage as said pawl-like element adjacent opposite ends thereof, said resilient means urging said pawl-like element longitudinally in one direction toward said cam means to its limit of movement in that direction which defines the locked position thereof by a force which at one position of said resilient means is sufficient to maintain said pawl-like element at its locked position against the force of said return means so that said pawl-like element is effective to maintain said spool at its operative position and which at the other position of said resilient means is insufficient to maintain said pawl-like element at its locked position and permit longitudinal movement thereof from its locked position to its releasable position and rotational movement from its latched position to its nonlatching position so that said pawl-like element is ineffective to maintain said valve spool at its operative position against the bias of said return means, said cam means engaging said pawl-like element whereby torque applied to said pawl-like element tends to move the latter longitudinally from its locked position to its releasable position against the bias of said variable resilient means and whereby movement of said pawl-like element from its locked position to its releasable position permits rotation of said pawl-like element from its latching position to its nonlatching position and whereby longitudinal movement of said pawl-like element from its releasable position to its locked position rotates said pawl-like element from its nonlatching position to its latching position.

8. The structure defined in claim 7 in which said last-mentioned means comprises a check valve-equipped passage extending from one of said pair of independent passages to communicate with said cavity adjacent said ratchet element for admitting fluid at the operative position of the spool from the connected passages between said inlet and cylinder ports to said ratchet element when the pressure of said fluid reaches a predetermined value.

9. In a hydraulic valve, a valve housing defining an internal cylindrical cavity, said housing having an inlet port adapted to be connected to a source of fluid pressure and a cylinder port adapted to be connected to one end of the cylinder of a hydraulic motor, said housing having a pair of independent passages in communication one with said inlet port and the other with said cylinder port and communicating with axially spaced openings into said cavity, a valve spool mounted in said cavity for axial movement between a neutral and an operative position, said spool being disposed at its neutral position whereby communication between said openings is blocked by said spool and being disposed at its operative position whereby said axially spaced openings are in communication through said cavity and said inlet port is in communication with said cylinder port, resilient return means urging said spool from its operative position to its neutral position, means for moving said spool against the bias of said return means from its neutral position to its operative position, said housing having a generally cylindrical passage intersecting said cylindrical cavity generally at right angles thereto and terminating in said housing in a wedge-shaped portion, said housing bordering the wedge-shaped portion of said passage defining a cam surface, a generally chisel-shaped pawl mounted in said passage in radially outwardly spaced spanned relation with a portion of said spool for longitudinal movements toward and away from said cam surface generally at right angles with respect to the spool between a locked position and a releasable position and for rotational movements between a latching position and a nonlatching position, means defining an abutment disposed within said last-mentioned passage longitudinally outwardly spaced from said pawl for longitudinal movements toward and away from said pawl between two positions, means connecting said last-mentioned means to said housing to releasably maintain said abutment rigidly fixed with respect to said housing at each of said two positions thereof, a resilient yieldable member disposed in said last-mentioned passage between said abutment and the end of said pawl opposite said cam surface, said resilient yieldable member being variable between a compressed position and an expanded position dependent upon the position of said abutment for urging said pawl with a force variable between two limits dependent upon the position of said resilient member longitudinally in one direction toward said cam surface to its limit of movement in that direction wherein said pawl abuts said cam surface at the terminal end of said last-mentioned passage which defines the locked position thereof, said pawl at its locked position being maintained by said cam surface generally radially disposed with respect to said spool which defines the latched position thereof, a ratchet element disposed generally between said pawl and said spool and mounted on the spool for common movements therewith and for limited radial movements with respect thereto toward and away from said pawl, a leaf spring disposed between said spool and said ratchet element urging the latter generally radially outwardly with respect to said spool into engagement with said pawl at the neutral position of the spool and during the movements of the spool between its neutral and operative positions, said ratchet element defining a radially inwardly projecting abutment axially spaced from said pawl at the neutral position of the spool when said pawl is at its latching position in a direction opposite to the direction of movement of the spool from its neutral to its operative position a distance substantially equal to the extent of movement of the spool between its neutral and operative position whereby said abutment is radially outwardly movable with respect to the spool at the operative position thereof into latched relationship with said pawl, and a check-valve-equipped passage formed in said housing and extending from one of said pair of independent passages to communicate with said cavity adjacent said ratchet element for admitting fluid at the operative position of the spool from the connected passages between said inlet and cylinder ports to said ratchet element when the pressure of said fluid reaches a predetermined value for moving said ratchet element generally radially inwardly against the bias of said leaf spring to release said abutment from latching relationship with said pawl and permit said return means to return the pawl to its neutral position.

10. In a hydraulic valve, a valve housing defining an internal cylindrical cavity, said housing having an inlet port adapted to be connected to a source of fluid pressure comprising the pressure side of a pump in communication with a reservoir of fluid and having an outlet port adapted to be connected to said reservoir of fluid and having a pair of cylinder ports adapted to be connected to opposite ends of the cylinder of a hydraulic motor, said housing having passages independently in communication with said inlet port and outlet port and the cylinder ports and terminating in axially spaced openings into said cavity, a valve spool mounted in said cavity for axial movement from a neutral position in one direction to one operative position and in the opposite direction to a second operative position, said spool having land and reduced portions disposed at the neutral position of the spool whereby communication from said inlet and outlet ports to said cylinder ports is blocked and whereby said inlet and outlet ports are in communication through said cavity and disposed at one operative position of the spool, whereby communication between said inlet port and outlet port is blocked by said spool and whereby said inlet port is in communication with one of said cylinder ports and said outlet port is in communication with the other of said cylinder ports through said cavity and disposed at the second operative position of the spool whereby communication between said inlet and outlet ports is blocked by said spool and whereby said inlet port is in communication with said other cylinder port and said outlet port is in communication with said one cylinder port, resilient return means urging said spool from either of said operative positions to its neutral position, means for moving said spool against the bias of said return means from its neutral position to either of said operative positions, said housing having a generally cylindrical passage intersecting said cylindrical cavity generally at right angles thereto and terminating in said housing in a wedge-shaped portion, said housing bordering the wedge-shaped portion of said passage defining a cam surface, a generally chisel-shaped pawl mounted in said passage in radially outwardly spaced spanned relation with a portion of said spool for longitudinal movements toward and away from said cam surface generally at right angles with respect to the spool between a locked position and a releasable position and for rotational movements between a latching position and a nonlatching position, means defining an abutment disposed within said last-mentioned passage longitudinally outwardly spaced from said pawl for longitudinal movements toward and away from said pawl between two positions, means connecting said last-mentioned means to said housing to releasably maintain said abutment rigidly fixed with respect to said housing at each of said two positions thereof, a resilient yieldable member disposed in said last-mentioned passage between said abutment and the end of said pawl opposite said cam surface, said resilient yieldable member being variable between a compressed position and an expanded position dependent upon the position of said abutment for urging said pawl with a force variable between two limits dependent upon the position of said resilient member longitudinally in one direction toward said cam surface to its limit of movement in that direction wherein said pawl abuts said cam surface at the terminal end of said last-mentioned passage which defines the locked position thereof, said pawl at its locked position being maintained by said cam surface generally radially disposed with respect to said spool which defines the latched position thereof, a ratchet element disposed generally between said pawl and said spool and mounted on the spool for common movements therewith and for limited radial movements with respect thereto toward and away from said spool, a leaf spring disposed between said spool and said ratchet element urging the latter generally radially outward with respect to said spool into engagement with said pawl during the movements of the spool between its operative positions, said ratchet element defining a pair of axially spaced generally radially inwardly projecting abutments, one being in latching relationship with said pawl at one operative position and the other being in latching relationship with said pawl at the second operative position, a check valve-equipped passage formed in said housing in communication with said inlet port and extending to communicate with said cavity adjacent said ratchet element for admitting fluid to said ratchet element when the pressure of said fluid reaches a predetermined value for moving said ratchet element radially inwardly against the bias of said leaf spring to release the abutment in latching relationship with said pawl and permit said return means to return the pawl to its neutral position.

11. The structure defined in claim 10 in which said housing is radially recessed from said cavity to form a pair of axially spaced housing shoulders projecting generally radially outwardly from said cylindrical cavity, said valve spool having intermediate its ends a diametrically reduced portion disposed adjacent said radially recessed portion of the housing and axially extended a distance approximating the distance between said housing shoulders to provide a pair of spool shoulders axially spaced a distance generally equal to the axial distance between the housing shoulders, and said return means comprising a coiled compression spring and a pair of washer-like elements, said washer-like elements being mounted on said reduced portion of the spool for axial movements relative thereto between said spool shoulders and disposed between said housing shoulders with each engaging a different one of said housing shoulders at its limit of movement in one direction, said spring encompassing the reduced portion of the spool and disposed between said washer-like elements to urge them in opposite directions each to its limit of movement in its biased direction at which each engages a different one of said spool shoulders and a different one of said housing shoulders at the neutral position of the valve spool, whereby said spool is movable in one direction against the bias of said spring to one operative position and is movable from its neutral position in the opposite direction against the bias of said spring to its second operative position.

12. The structure defined in claim 10 in which said ratchet element comprises a generally flat longitudinally extending shuttle formed with offset end portions defining said radially inwardly projecting abutments.

13. The structure defined in claim 10 wherein said housing has a passageway formed therein in communication with said outlet port and with one of said cylinder ports, in further combination with a removable valve screw normally threaded into said last-mentioned passage to close said passageway against fluid flow therethrough, whereby said valve screw may be released to open said passageway and adapt said valve for control of a single-acting hydraulic motor through the other of said cylinder ports.

14. The structure defined in claim 3 in which said ratchet element comprises a generally flat longitudinally extending shuttle with a generally radially inwardly offset end portion.

15. The structure defined in claim 3 in which said pawl-like element is mounted in said housing for movement toward a latching position and a non-latching position, in further combination with means for controlling the movements of said pawl-like element.

References Cited in the file of this patent

UNITED STATES PATENTS

| | | |
|---|---|---|
| 617,812 | Leckband | Jan. 17, 1899 |
| 2,225,082 | Orshansky | Dec. 17, 1940 |
| 2,448,557 | Stephens | Sept. 7, 1948 |
| 2,572,705 | Edman | Oct. 23, 1951 |
| 2,620,820 | Born | Dec. 9, 1952 |
| 2,689,585 | Presnell | Sept. 21, 1954 |